United States Patent [19]
Cobbledick et al.

[11] Patent Number: 5,614,581
[45] Date of Patent: Mar. 25, 1997

[54] CONDUCTIVE GRAY IN-MOLD COATING

[75] Inventors: David S. Cobbledick, Kent; Donald F. Reichenbach, Massillon, both of Ohio

[73] Assignee: GenCorp Inc., Fairlawn, Ohio

[21] Appl. No.: 544,743

[22] Filed: Oct. 18, 1995

Related U.S. Application Data

[63] Continuation-in-part of Ser. No. 53,795, Apr. 26, 1993, abandoned.

[51] Int. Cl.$^6$ .............................. C08K 3/04; B32B 27/38
[52] U.S. Cl. ...................... 524/495; 524/81; 524/496; 524/497; 428/301.4; 428/392; 428/413; 428/480; 428/483; 428/500; 428/522; 252/511; 252/518; 264/255; 264/257; 525/529; 525/530; 525/531; 525/533; 525/922
[58] Field of Search ................................ 428/413, 480, 428/483, 500, 522, 392, 288; 252/511, 518; 264/255, 257; 524/81, 495, 496, 497; 525/529, 530, 531, 533, 922

[56] References Cited

U.S. PATENT DOCUMENTS

| | | | |
|---|---|---|---|
| 2,245,006 | 6/1941 | Nixon | 103/232 |
| 3,947,422 | 3/1976 | Tatum et al. | 260/42.52 |
| 3,969,300 | 7/1976 | Nagata et al. | 525/531 |
| 4,076,780 | 2/1978 | Ditto | 264/40.5 |
| 4,076,788 | 2/1978 | Ditto | 264/255 |
| 4,081,578 | 3/1978 | van Essen et al. | 428/63 |
| 4,082,486 | 4/1978 | Cerano et al. | 425/129 R |
| 4,189,517 | 2/1980 | Shanoski et al. | 428/423.7 |
| 4,222,929 | 9/1980 | Shanoski et al. | 260/40 TN |
| 4,239,796 | 12/1980 | Shanoski et al. | 428/315 |
| 4,239,808 | 12/1980 | Arnason | 428/482 |
| 4,245,076 | 1/1981 | Marquardt | 525/328.2 |
| 4,331,735 | 5/1982 | Shanoski | 428/423.7 |
| 4,414,173 | 11/1983 | Cobbledick et al. | 264/257 |
| 4,515,710 | 5/1985 | Cobbledick | 252/511 |
| 4,524,162 | 6/1985 | Domeier | 523/438 |
| 4,534,888 | 8/1985 | Cobbledick et al. | 252/511 |
| 4,670,485 | 6/1987 | Hesse et al. | 525/187 |
| 4,719,038 | 1/1988 | Sobata et al. | 252/511 |
| 4,810,600 | 3/1989 | Periard et al. | 429/224 |
| 5,015,701 | 5/1991 | Domeier | 525/531 |
| 5,024,785 | 6/1991 | Hefner, Jr. et al. | 525/531 |
| 5,084,353 | 1/1992 | Cobbledick et al. | 428/413 |
| 5,109,088 | 4/1992 | Ohwada et al. | 526/273 |
| 5,164,464 | 11/1992 | Hefner, Jr. et al. | 525/531 |
| 5,354,609 | 10/1994 | Wang | 428/317.5 |

OTHER PUBLICATIONS

"Handbook of Epoxy Resins", Lee and Neville, McGraw Hill 1982 Reissue, pp. 14–47 to 14–49.
CRC "Handbook of Chemistry of Physics" 64th Edition, p. F–125.
"Handbook of Fillers and Reinforcements for Plastics" Published 1978, p. 283.
General Motors Engineering Standards 9523P, published Sep. 1, 1988 by General Motors Corporation, Detroit, Michigan.
General Motors Engineering Standards 9984823, published Feb. 1, 1989 by General Motors Corporation, Detroit, Michigan.
General Motors Engineering Standards 9984824, published Feb. 1, 1989 by General Motors Corporation, Detroit, Michigan.
General Motors Engineering Standards 9984825, published Feb. 1, 1990 by General Motors Corporation, Detroit, Michigan.
Trade Literature on ITW Ransburg "Paint Test Equipment" published Mar. 1, 1994 by ITW Ransburg Electrostatic Systems, Toledo, Ohio.
European Search Report on Application EP 94 30 2847.

*Primary Examiner*—Melvyn I. Marquis
*Assistant Examiner*—Randy Gulakowski
*Attorney, Agent, or Firm*—Robert F. Rywalski; Samuel B. Laferty

[57] ABSTRACT

A thermosetting in-mold coating for molded fiber-reinforced plastic parts is disclosed. The binder for the thermosetting coating is comprised of least one polymerizable epoxy-based oligomer having at least two acrylate groups and at least one copolymerizable ethylenically unsaturated monomer. The coating includes graphite and titanium dioxide which results in the gray color. The coating composition has good flow and coverage during molding, good adhesion, uniform color, good surface quality, and good paintability. The coating composition includes enough carbon black so that a 1.0 mil thick coating has a Ransburg conductivity meter reading of at least 165 units.

20 Claims, No Drawings

CONDUCTIVE GRAY IN-MOLD COATING

This is a continuation-in-part application of Application Ser. No. 08/053,795, filed Apr. 26, 1993, now abandoned, of D. Cobbledick et al. for "Conductive Gray In-Mold Coating".

FIELD OF INVENTION

The present invention relates to a thermosetting coating composition used for in-mold coating a molded plastic part such as made from a polyester resin, a vinyl ester resin, or a poly(ethylene terephthalate) resin. The coating uses graphite as a total or partial replacement for the conductive carbon black. A white pigment is then included which results in a uniform gray conductive in-mold coating. If sufficient graphite is not present to impart conductivity then carbon black is present so that the resulting coating has a Ransburg conductivity reading of at least 165 units.

BACKGROUND

Molded plastic parts can be in-mold coated with electrically conductive coatings. These parts can then be electrostatically painted. Conductive in-mold coatings which use carbon black exclusively as the conductive pigment are black. Very little carbon black (e.g. 5–15 parts by weight) is needed to impart conductivity. When parts with black coatings are painted with light colored paints such as white, large amounts or multiple layers of the lighter colored paints are required. Conductive carbon black can result in conductivity when used in very low amounts by weight (e.g. 8–10 parts per one hundred parts of resin). The ratio of solids to liquids in in-mold coating compositions is limited by viscosity and flow considerations as in-mold coatings do not use solvents to reduce the viscosity. It would be desirable to create a lighter colored conductive in-mold coating, requiring less light colored paint for effective covering, saving both time and materials.

SUMMARY OF THE INVENTION

It has been found that conductive in-mold coatings of light color, such as gray, can be produced using graphite as a major portion of the conductive pigment and a white pigment such as titanium dioxide to create a light reflective surface. These in-mold coatings can be effectively painted with reduced amounts of light colored paints.

DETAILED DESCRIPTION OF THE INVENTION

The thermosetting coating compositions of the present invention are based upon a polymerizable epoxy-based oligomer having at least two acrylate (or methacrylate or ethacrylate) groups and are prepared by reacting acrylic acid, methacrylic acid, ethacrylic acid, or similar acids with an epoxy based oligomer or resin such as bisphenol A epoxy, a tetrabromo bisphenol A epoxy, phenolic novalak epoxy, tetraphenylolethane epoxy, dicycloaliphatic epoxy and equivalents. Mixtures of these epoxy based oligomers can be used. The term (alkyl) acrylate shall be used to specify acrylate, methacrylate, or ethacrylate. Of these materials it is preferred to use a diacrylate terminated bisphenol A epoxy oligomer. They have weight average molecular weights of from about 500 to about 1,500. Such materials are well known to the art and to the literature, as for example, Cargill Resin 1570, a diacrylate ester of a liquid bisphenol A epoxy resin. Examples of other suitable materials can be found in "Heat Resistant Vinyl Ester Resin," M. B. Launikitis, Technical Bulletin, SC:116–76, Shell Chemical Company, June 1976 and Shell Chemical Company Technical Bulletins SC:16–76 and C:60–78. Incorporated herein by reference for its teachings is U.S. application Ser. No. 08/053,795, abandoned filed Apr.26, 1993 for D. Cobbledick et al. entitled "Conductive Gray In-Mold Coating".

When certain soluble ionic organic salts are present in the above vinyl ester resins or when these salts are added to an in-mold coating composition less conductive carbon black is required to achieve a specified Ransburg conductivity meter reading. The amount of said salt is desirably from about 0.1 to about 1.5 or 5 parts by weight per one hundred parts by weight of said epoxy based oligomer (vinyl ester resin), (j) The soluble ionic organic salt, which is added to the in-mold composition to improve conductivity without increasing viscosity, has the following general formula:

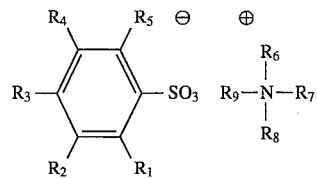

where $R_1$ through $R_5$ is selected from the group consisting of hydrogen atoms, methyl, ethyl and propyl radicals, methyl being preferred and where $R_6$ through $R_9$ are hydrogen atoms or alkyl radicals of from 1 to 8 carbon atoms which may be the same or different and where it is preferred that all of the $R_6$ through $R_9$ radicals be hydrogen atoms or methyl or ethyl radicals. Examples of such compounds are tetra ethyl ammonium p-toluene sulfonate and tetra methyl ammonium p-toluene sulfonate. The use of these salts is illustrated in European patent publication 0461 320 B1 published Mar. 9, 1994.

A copolymerizable ethylenically unsaturated monomer is used to copolymerize and to crosslink the polymerizable oligomers. Suitable monomers include styrene (preferred), alpha methyl styrene, vinyl toluene, t-butyl styrene, chlorostyrene, methyl methacrylate, diallyl phthalate (with styrene or methyl methacrylate and the like), triallyl cyanurate, triallyl isocyanurate, divinyl benzene, methyl acrylate and equivalents or mixtures thereof. The unsaturated monomer is used in an amount of from about 80 to about 160 parts by weight and preferably from about 80 to about 120 parts by weight per 100 parts by weight of the polymerizable epoxy based oligomer.

For further copolymerization and crosslinking and to improve hardness of the resulting coating there is used in the in-mold coating composition a monoethylenically unsaturated compound having a

group, and at least one —NH$_2$, —NH— or —OH group. Examples of such monomeric compounds are hydroxyl propyl methacrylate (preferred), hydroxyethyl methacrylate, hydroxy ethyl acrylate, hydroxy ethyl crotonate, hydroxypropyl acrylate, hydroxy polyoxypropylene acrylate, hydroxy polyoxypropylene methacrylate, hydroxy polyoxyethylene methacrylate, acrylamide, methacrylamide, N-hydroxymethyl acrylamide, N-hydroxymethyl methacrylamide, and so forth, and mixtures of the same. These compounds are used in an amount of from about 10 parts to 120 parts by weight and preferably from about 10 to 60 parts by weight per 100 parts by weight of the polymerizable epoxy based oligomer.

Adhesion agents include various polymers or copolymers made from an alkyl methacrylate wherein the alkyl portion has from 1 to 6 carbon atoms, desirably from 1 to 4 carbon atoms, and preferably 1 or 2 carbon atoms, that is methyl or ethyl. Thus, preferred polymers include methyl methacrylate, ethyl methacrylate, and the like. The molecular weight of the polymers generally are given in terms of inherent viscosity, that is, inherent viscosity of a solution containing 0.25 grams of the polymer and 50 milliliters of methylene chloride measured at 20° C. using a number 50 Cannon-Fenske viscometer. The inherent viscosity of such polymers is from about 0.15 to 1.3 and preferably from about 0.2 to 0.6. Such alkyl methacrylate polymers are known to the art and can be commercially obtained from DuPont under the mark "ELVACITE." Another adhesive agent which is preferred is polyinyl acetate which has a molecular weight of from about 50,000 to 200,000 and preferably from about 80,000 to 150,000.

The amounts of the adhesion agent of the present composition is up to 30 parts by weight, desirably up to 25 parts by weight, and preferably up to 20 parts by weight, per 100 parts by weight of the epoxy based polymerizable oligomer.

As a mold release agent as well as a secondary cure accelerator, various zinc salts of fatty acids having at least 10 carbon atoms can be utilized. Fatty acids are well known. See "Organic Chemistry," Fieser and Fieser, D.C. Health and Company, Boston, 1944, pages 88, 381–390, 398 and 401, "Hackh's Chemical Dictionary," Grant, McGraw Hill Book Company, New York, 1969, page 261, and "Whittington's Dictionary of Plastics," Whittington, Technomic Publishing Co., Inc., Stamford, Conn., 1968, pages 35, 102 and 261, all of which are hereby fully incorporated by reference. Mixtures of zinc salts of the fatty acids can be used. Examples of some zinc salts are zinc palmirate, zinc stearate, zinc ricin-oleate, and the like. It is preferred to use the zinc salt of a saturated fatty acid such as zinc stearate. The zinc salt is used in an amount from about 0.2 to 5 parts by weight and preferably from about 0.2 to 2.5 parts by weight per 100 parts by weight of the polymerizable epoxy based oligomer.

Optionally and desirably a calcium salt of a fatty acid having at least 10 carbon atoms can also be used in the in-mold coating composition as a mold release agent and to control the rate of the cure. Fatty acids are well known such as those set forth hereinabove. Mixtures of calcium salts of the fatty acids can be used. Examples of some calcium salts are calcium stearate, calcium palmirate, calcium oleate and the like. It is preferred to use the calcium salt of a saturated fatty acid like calcium stearate. These calcium salts can be used, from about 0.2 to 5 parts by weight of calcium salt per 100 parts by weight of the polymerizable epoxy based oligomer.

An accelerator is used for the peroxide initiator and is a material such as a drier, e.g., cobalt octoate (preferred). Other materials which can be used are zinc naphthenate, lead naphthenate, cobalt naphthenate and manganese naphthenate. Soluble Co, Mn and Pb salts of linoleic acid, also, can be used. Mixtures of accelerators can also be used. The accelerator is used in an amount of from about 0.01 to about 1 part and preferably from about 0.01 to about 0.5 parts by weight per 100 parts by weight of the polymerizable epoxy based oligomer.

Graphite in an amount from about 5 to about 150 parts, desirably from about 20 to about 85 parts, and preferably from about 40 to about 70 parts by weight per 100 parts by weight of the polymerizable epoxy based oligomer is used in the in-mold coating to give conductivity. The graphite can be any graphite including mined graphite and that produced synthetically. The mined graphites contain various impurities. The mined graphites useful in this embodiment typically have from 60 to 100 wt. percent graphite and 0 to 40 wt. percent ash, which is believed to be impurities. The preferred graphite has a small particle size to produce a smooth molding composition. The preferred graphites have particle sizes less than the pore size in 100 mesh screens, desirably less than the pore sizes in 325 mesh screen, preferably an average particle size of from about 5 to about 30 µm, or said particle ideally being about 15 µm.

Conductive carbon black can optionally be used in the composition. Conductive carbon black can significantly reduce the amount of graphite required to achieve conductivity. The amount of conductive carbon black used in the in-mold composition is up to about 15 parts, desirably up to about 10 parts, and preferably up to about 5 parts by weight based on 100 parts by weight of the polymerizable epoxy-based oligomer. A desirable amount of conductive carbon black is from about 2 to 10 percent, or about 5 percent by weight based upon the amount of graphite.

Conductive carbon blacks are high structure carbon blacks such as Vulcan™ XC-72R from Cabot Corporation. They impart conductivity by creating a continuous carbon network which conducts electricity. Other conductive fillers can also be used.

White pigments are used to lighten the color of the in-mold coating. Examples of white pigments that can be used with or without titanium dioxide are metal titanates, aluminum and calcium silicates, talcs, and particles with voids therein. The preferred white pigment is titanium dioxide and modified titanium dioxide pigments. One preferred titanium dioxide pigment is Zopaque™ RCL-9, a chloride process rutile type available from SMC Corp. A modified titanium dioxide is Zopague™ RCL-2 also available from SCM, having a coating of alumina and silica oxides. As with the graphite, the pigments of small sizes such as diameters smaller than the pores of a 100 or 325 mesh screen are preferred. The white pigments are used in amounts from about 5 to about 120 parts, desirably from about 10 to about 80 parts, and preferably from about 15 to about 50 parts by weight per 100 parts of the polymerizable epoxy-based oligomer.

A filler is used in the in-mold coating composition in an amount of from about 20 to about 100 parts by weight and preferably from about 20 to about 80 parts by weight per 100 parts by weight of the polymerizable epoxy based oligomer. Examples of fillers are clay, MgO, Mg(OH)$_2$, CaCO$_3$, silica, calcium silicate, mica, magnesium silicate, aluminum hydroxide, barium sulfate, talc, hydrated silica, magnesium carbonate and mixtures of the same. The fillers should generally be of a small particle size. Of these fillers, talc is preferred. The fillers can be utilized to impart a desired viscosity and flow to the in-mold composition for molding and contribute to desired physical properties in the resulting thermoset in-mold coating. Fillers, can also improve adhesion. Talc, a hydrous-form of magnesium silicate promotes adhesion to calcium carbonate filled sheet molding compounds. However, care should be exercised in the use of high filler contents as this can yield high viscosities and result in flow and handling difficulties.

Optionally, there is employed in the in-mold coating composition a copolymerizable or cocurable diacrylate compound having a weight average molecular weight of from about 250 to 5,000, in an amount of from about 5 to 120 parts by weight and preferably from about 5 to 60 parts by weight per 100 parts by weight of the polymerizable epoxy based oligomer. Such cocurable diacrylate compounds include (1) at least one polyoxyalkylene glycol based oligomer having two acrylate groups, and (2) at least one polyurethane based oligomer having two acrylate groups, and mixtures of (1) and (2). Although the above-noted amounts of (1) and (2) can be utilized, it has been found that it is desirable to eliminate such compounds or keep their amounts less than 5 parts by weight since they reduce hardness at high temperatures, e.g., at 300° F.

Examples of said diacrylate compounds (1) include triethylene glycol diacrylate, tetraethylene glycol diacrylate, tetraethylene glycol dimethacrylate, polyethylene glycol diacrylate, polypropylene glycol diacrylate, polyethylene glycol dimethacrylate or polyoxyethylene glycol dimethacrylate (preferred), polypropylene glycol diacrylate, and so forth, and mixtures thereof. These acrylates are made by reacting polyoxyalkylene glycols such as polypropylene ether glycol with acrylic acid, methacrylic acid, and the like. Since some of these reactive difunctional materials can be made by reacting unsaturated acids and alcohols, they can contain some OH and/or COOH groups.

Examples of diacrylate compounds (2) include a polyesterurethane diacrylate, a polyetherurethane diacrylate, a polyesteretherurethane diacrylate, or other polyurethane oligomer having two acrylate groups. These materials may be made by reacting a polyetherdiol (e.g., a polypropylene ether diol), a polyesterdiol (e.g., a polyethylene adipate diol), and/or a polyetherester diol (e.g., a polypropylene ether adipate diol), and so forth with a diisocyanate like tolylene diisocyanate, 4,4'-diphenylmethane diisocyanate, hexamethylene diisocyanate and the like in an amount sufficient to form a diisocyanate terminated polyurethane prepolymer which is then reacted with hydroxy propyl acrylate, hydroxy ethyl acrylate, hydroxy ethyl methacrylate and so forth to form the diacrylate terminated polyurethane oligomer or polymer. Mixtures of these acrylate terminated polyurethane oligomers can be used. The term "acrylate" as used here is intended to cover methacrylate and ethacrylates as well as acrylates. Of these materials it is preferred to use a diacrylate polyesterurethane oligomer. Acrylate terminated polyurethane oligomers, e.g., curable by light, ultraviolet, electric beam and/or infrared and so forth, are well known, and sometimes are referred to as irradiation or radiation curable materials.

The diacrylate compounds (1) and/or (2), above, reduce the hardness of the in-mold coating.

An organic free-radical initiator or a free radical generator (catalyst) such as a peroxide is used to catalyze the polymerization, copolymerization and/or crosslinking of the ethylenically unsaturated oligomers and the other ethylenically unsaturated materials. Examples of free-radical initiators, include tertiary butyl perbenzoate, tertiary butyl peroctoate in diallyl phthalate, diacetyl peroxide in dimethyl phthalate, dibenzoyl peroxide, butyl perisobutyrate, di(p-chlorobenzoyl) peroxide in dibutyl phthalate, di(2,4-chlorobenzoyl) peroxide with dibutyl phthalate, dilauroyl peroxide, methyl ethyl ketone peroxide, cyclohexanone peroxide in dibutyl phthalate, 3,5-dihydroxy-3,4-dimethyl-1,2-dioxacyclopentane, t-butylperoxy(2-ethyl hexanoate), caprylyl peroxide, 2,5-dimethyl-2,5-di(benzoyl peroxy) hexane, 1-hydroxy cyclohexyl hydroperoxide-1, t-butyl peroxy (2-ethyl butyrate), 2,5-dimethyl-2,5-bis(t-butyl peroxy) hexane, cumyl hydroperoxide, diacetyl peroxide, t-butyl hydroperoxide, ditertiary butyl peroxide, 3,5-dihydroxy-3, 5-dimethyl-1,2-oxacyclopentane, 1,1-bis(t-butyl peroxy)-3, 3,5-trimethyl cyclohexane, and the like and mixtures thereof. It is desirable sometimes to use mixtures of initiators to take advantage of their different decomposition rates at different temperatures and the like. A preferred initiator to use is tertiary butyl perbenzoate. The peroxide initiator should be used in an effective amount to overcome the effect of the inhibitor and to cause crosslinking or curing of the ethylenically unsaturated materials during the cure cycle of the in-mold coating process. In general, the peroxide initiator is used in an amount of up to about 5 percent and preferably up to about 2 percent, by weight based on the weight of the ethylenically unsaturated materials employed in the in-mold coating composition.

The unsaturated materials mentioned above, thus, are used in an effective amount to provide on cure (e.g., polymerization, copolymerization and/or cross-linking) a thermoset composition.

To prevent premature gelation of the ethylenically unsaturated materials and to provide for improved shelf-life or storageability inhibitors are added to the composition or are provided in the raw materials. Examples of inhibitors include hydroquinone, benzoquinone, p-t-butyl catechol and the like and mixtures thereof.

Optionally, the in-mold composition can be compounded with other components such as mold release agents, anti-degradants, UV absorbers, paraffin wax, solid glass or resin microspheres, thickening agents, low shrink additives and the like. These compounding ingredients should be used in amounts sufficient to provide satisfactory results with respect to their intended purpose. It is not desirable to use in the in-mold composition of this invention materials like butadiene-styrene block copolymers or fatty alcohol phosphates.

For ease in handling, materials such as polyvinyl acetate may be dissolved in a reactive monomer like styrene. The viscosity of the oligomers can be reduced by dilution with styrene and the like. The ingredients of the in-mold composition should be readily mixed and handled at ambient or room temperature or temperatures below the polymerization temperature so that they may be readily pumped to and injected into the mold. The ingredients can be warmed or heated before or during mixing and mixed in steps to facilitate thorough mixing, dispersion and solution. Also, the bulk of the ingredients can be thoroughly mixed and the remainder including the catalyst separately mixed and then both can be pumped to a mixing head to be mixed together and then injected into the mold.

With the peroxide initiator (catalyst) the in-mold composition exhibits a shelf-life at room temperature (about 25° C.) of several weeks, and without the initiator it exhibits a shelf life of several months at room temperature. Thus, the initiator is preferably added to the composition and thoroughly mixed therewith just before molding.

All of the ingredients of the in-mold coating composition should be kept dry or have a minimal amount of moisture or the water content should be controlled to obtain reproducible results and to prevent pore formation.

Mixing of the ingredients of the in-mold composition should be thorough. Injection molding, compression molding, transfer molding, or other molding apparatus or machines can be used for the in-mold coating. Molding apparatus and methods may be found in U.S. Pat. No. 4,081,578, which is hereby fully incorporated by reference. The in-mold coating composition can be applied to the substrate and cured at a temperature of from about 270° to 330° F. (132 to 166° C.) and at a pressure of about 500 to 1500 or about 1,000 psi (35 to 105 or 70 kg/cm$^2$) for from about 0.25 to 3 minutes.

The processes and products of the present invention can be used in the manufacture of automobile parts such as grille and headlamp assemblies, deck hoods, fenders, door panels and roofs as well as in the manufacture of parts for recreational all terrain vehicles, motorized water vehicles, food trays, appliance and electrical components, furniture, machine covers and guards, bathroom components, structural panels and so forth.

The molded plastic substrate can be a molded part or a glass fiber reinforced plastic (FRP) substrate based on thermoset resins or thermoplastic resins. The thermoset resins such as polyester resin or vinyl ester resin, to which the in-mold composition is applied, can be made into a sheet molding compound (SMC) or a bulk molding compound (BMC), or other FRP material as well as a high strength molding composition (HMC) or a thick molding compound. The FRP substrate can have from about 10 to about 75 percent and desirably from about 25 to 35 or from about 55 to 60 percent by weight of glass fibers. The glass fiber reinforced thermoset plastic (FRP) substrate can be rigid or semirigid. In lieu of glass fibers, other conventional fibers can also be utilized either separately, or in combination. Examples include carbon fibers, boron fibers, graphite fibers, nylon fibers, and the like. The substrate can contain flexibilizing polymers, e.g., contain a flexibilizing moiety such as an adipate group in the polyester, elastomers such as the styrene-butadiene block copolymers, plastomers, conventional impact modifiers and the like. Examples of unsaturated polyester glass fiber thermosets are set forth in "Modern Plastics Encyclopedia, 89," mid October 1988, vol. 65, No. 11, McGraw-Hill, Inc., New York, pages 208–214, and in various Shell Chemical Company Technical Bulletins on vinyl esters, noted hereinabove, all of which are hereby fully incorporated by reference. Examples of thermoplastic resin substrates include polyurethanes, polyesters, polycarbonates, polysulfones, polyamides, polyimides, polyacrylates, poly(alkylenes) and polyethers. Aromatic groups within these polymers would tend to increase their potential use temperature.

The compositions of the present invention generally exhibit good pumpability and flow in the mold. They can give rapid cures as low as 12 to 50 seconds at 300° F. They also show good adhesion to paints and can be used not only as an in-molding coating to cover blemishes but as a good conductive coating for electrostatic painting and as a primer for most paint finish systems such as soluble acrylic lacquers, acrylic dispersion lacquers, water borne acrylic enamels, high solids solution acrylic enamels, acrylic non-aqueous dispersions and urethanes.

The invention will be better understood by reference to the following examples wherein parts noted are parts by weight unless otherwise indicated.

EXAMPLES

In-mold coating compositions were formulated as in Table I. The first 4 components were added to a reactor and blended with heating to 38° C. The next three ingredients were added and blended in using a high shear mixer. The carbon black, silica, diacrylate ester were then mixed in under high shear for 30 min. with heat until reaching 44° C. Once 44° C. was reached, heating was discontinued and cooling was started. Then the last components were added and mixed for one hour at 38° C. Formulations 1 through 6 were prepared by this process.

The total amount of styrene in Table I is nearly constant at about 85 g in all the formulations since about 18 g of styrene is used as a diluent in the diacrylate ester, from 15–45 grams of styrene is in the low profile additive and from 15 to 45 grams of styrene is added as free styrene and about 7 g of styrene accompanied the benzoquinone. Formulations 2 and 3 compare using $TiO_2$ as a replacement on (a weight basis) for some of the talc with using $TiO_2$ in addition to the normal amount of talc. Formulations 4, 5 and 6 show the use of three different graphites.

TABLE I

| CONDUCTIVE IN-MOLD COATINGS | | | | | | |
|---|---|---|---|---|---|---|
| Formulation: | 1 | 2 | 3 | 4 | 5 | 6 |
| 85 wt. % Diacrylate ester of bisphenol A Epoxy in 15 wt. % Styrene (100 parts oligomer) | 117.65 | 117.65 | 117.65 | 117.65 | 117.65 | 117.65 |
| Low Profile Additive 40 wt. % poly(vinyl acetate) in 60 wt. % styrene | 25 g | 75 g | 25 g | 25 g | 25 g | 50 g |
| Hydroxylpropyl Methacrylate | 30 | 30 | 30 | 30 | 30 | 30 |
| Styrene | 45.35 | 15.35 | 45.35 | 45.35 | 45.35 | 30.35 |
| 2 wt. % Benzoquinone in Styrene | 7.0 | 7.0 | 7.0 | 7.0 | 7.0 | 7.0 |
| Zinc Stearate | 1.85 | 1.85 | 1.85 | 1.85 | 1.85 | 1.85 |
| Calcium Stearate | 0.45 | 0.45 | 0.45 | 0.45 | 0.45 | 0.45 |
| Cobalt Hex-Chem 12 wt. % in Mineral Spirits | 0.15 | 0.15 | 0.15 | 0.15 | 0.15 | 0.15 |
| Carbon Black Vulcan ™ XC-72R | 8.5 | 9.0 | 8.5 | 2.0 | 2.0 | 3.0 |
| Cab-O-Sil M-5 (silica) | — | — | — | — | — | 2.5 |
| Hydrous Magnesium Silicate | 80.0 | 50.0 | 80.0 | 40.0 | 40.0 | 30.0 |
| #508 Graphite Powder[a] | | | | 40.0 | | |
| #8535 Graphite Powder[b] | | | | | 40.0 | |
| #8635 Graphite Powder[c] | | | | | | 60.0 |
| ZOPAQUE ™ RCL-9 $TiO_2$ | | 30.0 | 30.0 | 20.0 | 20.0 | 20.0 |

All of the above amounts are in grams.
[a]#508 Graphite is supplied by Asbury Graphite Mills and is at least 85 wt. % carbon and passes through a 325 mesh screen.
[b]#8535 Graphite is supplied by Superior Graphite Co.
[c]#8635 Graphite is supplied by Superior Graphite Co.

Formulations 1–6 were then in-mold coated onto conventional fiberglass reinforced sheet-molded thermoset polyester-styrene sheets having 25 wt. % glass fibers at 1000 psi and 300° F. for about 45 seconds. The tests on the in-mold coatings are shown in Table II.

TABLE II

PHYSICAL PROPERTIES OF IN-MOLD COATINGS

| In-Mold Coating | A | B | C | D | E | F |
|---|---|---|---|---|---|---|
| Coating Formulation Used | 1 | 2 | 3 | 4 | 5 | 6 |
| Adhesion[d] | Good | Good | Good | Good | Good | Good |
| Conductivity[e] @ 1.0 mil | >165 | >165 | >165 | >165 | >165 | >165 |
| Color | Black | Non-uniform dark gray | Non-uniform dark gray | Uniform light gray | Uniform light gray | Uniform light gray |

[d]Adhesion was tested with a scalpel screening test.
[e]Conductivity was tested with a Ransburg meter available from Ransburg Electro-Coating Corporation. Values above 120 are suitable for electrostatic painting.

In-mold coatings A–F all showed good adhesion by a scalpel screening test, and excellent conductivity for electrostatic painting of >165 by the Ransburg meter reading. In-mold coating A which does not have $TiO_2$ pigment is used as a control and is black. In-mold coating B which has $TiO_2$ but no graphite is slightly lighter in color (i.e. dark gray) due to the $TiO_2$ than A, but non-uniform in color and unacceptable as a gray primer coat. In-mold coating C which also has no graphite but more hydrous magnesium silicate (talc) is also non-uniform in color. Thus the amount of hydrous magnesium silicate (i.e. talc) does not have an effect on the non-uniform color problem. In-mold coatings D, E, and F, which use three different graphites from two different suppliers, all produced uniform light gray coatings.

In coatings D, E, and F (formulations 4–6) the combined amount of hydrous magnesium silicate, graphite and carbon black (non-white pigments) was kept constant at 82 to 93 parts by varying the amount of talc. Thus D, E, and F have approximately the same combined amount of hydrous magnesium silicate, graphite and carbon black as coatings A and C (formulations 1 and 3). Coatings B and C had 89 and 118.5 parts pigments and 59 and 89 parts respectively of non-white pigments and 30 parts white pigments. This shows that non-uniform color is obtained in the in-mold coating irrespective of whether the white pigments replace on a weight basis the non-white pigments or is used in addition to the non-white pigments.

Additional formulations G-O were ran to show a comparison of how much graphite, how much carbon black and how much combined graphite and carbon black were required to impart a Ransburg meter conductivity of at least 165 units with a 1.0 mil thick coating. Note that the exact amount of the carbon black and graphite required will vary with the type of carbon black, type of graphite and other formulations variables. The formulations in Tables III and IV are very similar to formulations 4 and 5 of Table I (i.e. most components are present in nearly identical amounts and hydrous magnesium silicate is present at 40 g) except the amount of carbon black and graphite was varied. The data in Tables III and IV also illustrates that carbon black and $TiO_2$ alone always result in non-uniform streaked splotchy appearance while the addition of graphite (either with carbon black and $TiO_2$ or with $TiO_2$ alone) results in a uniform gray color.

TABLE III

CONDUCTIVE IN-MOLD COATINGS

| Formulation: | G | H | I | J |
|---|---|---|---|---|
| 80 wt. % Diacrylate Ester of Bisphenol A Epoxy in 15 wt. % Styrene and 5 wt. % Hydroxypropyl Methacrylate (100 parts oligomer) | 125 g | 125 | 125 | 125 |
| Low Profile Additive 40 wt. % poly(vinyl acetate) in 60 wt. % styrene | 25 g | 25 g | 25 g | 25 g |
| Hydroxypropyl Methacrylate | 23.75 | 23.75 | 23.75 | 23.75 |
| Styrene | 44.25 | 44.25 | 44.25 | 44.25 |
| 2 wt. % Benzoquinone in Styrene | 7.0 | 7.0 | 7.0 | 7.0 |
| Zinc Stearate | 1.85 | 1.85 | 1.85 | 1.85 |
| Calcium Stearate | 0.45 | 0.45 | 0.45 | 0.45 |
| Cobalt Hex-Chem 12 wt. % in Mineral Spirits | 0.15 | 0.15 | 0.15 | 0.15 |
| Carbon Black Vulcan ™ XC-72R | 8.0 | 6.0 | 4.0 | 2.0 |
| Cab-O-Sil M-5 (silica) | — | — | — | — |
| Hydrous Magnesium Silicate | 40.0 | 40.0 | 40.0 | 40.0 |
| #8535 Graphite Powder | 0 | 0 | 0 | 0 |
| ZOPAQUE ™ RCL-9 $TiO_2$ | 20.0 | 20.0 | 20.0 | 20.0 |
| Properties of Composition | | | | |
| Brookfield Viscosity 86° F. #7 Spindle @ 1000 rpm | 6100 cps | 3600 cps | 1900 cps | 900 cps |
| Properties of Cured Coating | | | | |
| Conductivity @ 1.0 mil | >165 | >165 | Non-Conductive | Non-Conductive |
| Appearance | Streaked, splotchy appearance. Gray, not uniform in colors. | | | |

TABLE IV

| | CONDUCTIVE IN-MOLD COATINGS | | | | |
|---|---|---|---|---|---|
| Formulation: | K | L | M | N | O |
| 80 wt. % Diacrylate Ester of Bisphenol A Epoxy in 15 wt. % Styrene and 5 wt. % Hydroxypropyl Methacrylate (100 parts oligomer) | 125 g | 125 | 125 | 125 | 125 |
| Low Profile Additive 40 wt. % poly(vinyl acetate) in 60 wt. % styrene | 25 g | 25 g | 25 g | 25 g | 25 g |
| Hydroxypropyl Methacrylate | 23.75 | 23.75 | 23.75 | 23.75 | 23.75 |
| Styrene | 44.25 | 44.25 | 44.25 | 44.25 | 44.25 |
| 2 wt. % Benzoquinone in Styrene | 7.0 | 7.0 | 7.0 | 7.0 | 7.0 |
| Zinc Stearate | 1.85 | 1.85 | 1.85 | 1.85 | 1.85 |
| Calcium Stearate | 0.45 | 0.45 | 0.45 | 0.45 | 0.45 |
| Cobalt Hex-Chem 12 wt. % in Mineral Spirits | 0.15 | 0.15 | 0.15 | 0.15 | 0.15 |
| Carbon Black Vulcan ™ XC-72R | 2.0 | 0 | 0 | 0 | 0 |
| Cab-O-Sil M-5 (silica) | — | — | — | — | — |
| Hydrous Magnesium Silicate | 40.0 | 40.0 | 40.0 | 40.0 | 40.0 |
| #8535 Graphite Powder | 40.0 | 80.0 | 60.0 | 40.0 | 20.0 |
| ZOPAQUE ™ RCL-9 $TiO_2$ | 20.0 | 20.0 | 20.0 | 20.0 | 20.0 |
| Properties of Composition | | | | | |
| Brookfield Viscosity 86° F. #7 Spindle @ 1000 rpm | 2100 cps | 6000 cps | 2000 cps | 1500 cps | 1200 cps |
| Properties of Cured Coating | | | | | |
| Conductivity @ 1.0 mil | >165 | >165 | ≈130 Non-Conductive Spots | Non-Conductive | Non-Conductive |
| Appearance | Uniform Gray | Uniform Dark Gray | Uniform Gray | Uniform Gray | Uniform Gray |

Table III shows that with this particular formulation at more than 4 (e.g. 6 or more in formulations H and G) grams of carbon black, when used without graphite, is required to impart a Ransburg meter conductivity of at least 165 units. The table also shows that irrespective of whether 2 or 8 grams of carbon black is used that the appearance is non-uniform, streaked, and splotchy even though the amount of $TiO_2$ is only 20 grams. (In previous Tables I and II formulations 2 and 3 the $TiO_2$ was 30 g). Table III also shows the effect of carbon black on the formulation viscosity. When the amount of carbon black is doubled the viscosity more than doubles.

The results in Table IV illustrate that more than 60 (e.g. at least 80 in formulation L) grams of graphite are needed, when no carbon black is used, to result in a uniform Ransburg conductivity of at least 165 units. An equivalent Ransburg conductivity was achieved in Table III with only 6 grams of carbon black. Thus at least 10 times as much graphite as carbon black on a weight basis is needed to impart equivalent conductivity to this in-mold coating formulation. Table IV also illustrates that as little as 20 grams (formulation O) of graphite is needed to result in a uniform distribution of graphite and $TiO_2$ such that a uniform gray color results instead of a non-uniform streaky splotchy appearance. Note in Table IV formulations L and N that doubling the graphite amount quadruples the viscosity.

Thus the data of the tables illustrates that in-mold coating formulation of uniform color do not result from mixtures of carbon black and $TiO_2$ alone. Uniform gray colors can result from mixtures of graphite and $TiO_2$ but the amount of graphite required for a Ransburg conductivity of at least 165 units is approximately 10 times or more the amount of carbon black. Formulations 4, 5, 6 and K illustrate a preferred embodiment with enough graphite (40 or 60 g) to result in a uniform color and enough carbon black (2 or 3 grams) to result in a Ransburg conductivity meter reading of at least 165 units. Ransburg #236 sprayability meter for conductivity is specified in General Motors Engineering Standards test GM 9523P for coated plastic parts. The reading needs to be at least an average of 140 on three readings on a 0.5 mil thick coating. Other customers who use electrostatic spraying specify comparable tests.

While in accordance with the Patent Statutes, the best mode and preferred embodiment has been set forth, the scope of the invention is not limited thereto, but rather by the scope of the attached claims.

What is claimed is:

1. A laminate, comprising:

a thermoset in-mold coating composition of uniform gray color adhered to a molded thermoset or thermoplastic substrate, and which when cured in a layer 1.0 mil thick has a Ransburg conductivity meter reading of at least 165 units said in-mold coating composition comprising;

(a) at least one polymerizable epoxy based oligomer having at least two (alkyl) acrylate groups and a weight average molecular weight of from about 500 to about 1,500, said (alkyl) acrylate being acrylate, methacrylate, or ethacrylate;

(b) from about 80 to 160 parts by weight of at least one copolymerizable ethylenically unsaturated monomer;

(c) from about 10 to 120 parts by weight of at least one copolymerizable monoethylenically unsaturated compound having a —CO— group and at least one —NH$_2$, —NH—, or —OH group;

(d) from about 20 to 85 parts by weight graphite, and (e) from about 15 to 30 parts by weight of one or more white pigments and (f) optionally up to 10 parts by weight of conductive carbon black wherein said parts by weight are based upon 100 parts by weight of said epoxy-based oligomer.

2. A laminate according to claim 1, wherein said white pigments comprise titanium dioxide pigments.

3. A laminate according to claim 2, wherein the amount of said (b) monomer is from about 80 to 120 parts by weight wherein the amount of (c) compound is from about 10 to 60 parts by weight, wherein the amount of said graphite is from about 40 to 85 parts by weight, and wherein said molded thermoset or thermoplastic substrate has from about 10 to 75 percent by weight fibers therein.

4. A laminate according to claim 3, wherein the in-mold coating composition includes conductive carbon black at levels up to 5 parts by weight and wherein said molded thermoset or thermoplastic substrate is an unsaturated polyester thermoset or vinyl ester thermoset resin.

5. A laminate according to claim 4, wherein said polymerizable epoxy-based oligomer comprises a diacrylate ester of a liquid bisphenol A epoxy resin, wherein said at least one copolymerizable ethylenically unsaturated monomer comprises styrene, and wherein said copolymerizable monoethylenically unsaturated compound comprises hydroxypropyl methacrylate.

6. A laminate according to claim 5, wherein said graphite is present in an amount from about 40 to about 60 parts by weight, said titanium dioxide pigments are present from 20 to 30 parts by weight, said carbon black is present in amounts from 2 to 3 parts by weight.

7. A laminate according to claim 2, wherein said graphite is present in an amount from about 40 to about 60 parts by weight, said titanium dioxide pigments are present from 20 to 30 parts by weight, said carbon black is present in amounts from 2 to 3 parts by weight.

8. A laminate according to claim 3, wherein the in-mold coating composition has from 0 to 5 parts by weight carbon black and from 20 to 80 parts by weight of filler and from about 20 to about 30 parts by weight titanium dioxide pigments, and from about 40 to about 60 parts by weight graphite.

9. A laminate according to claim 3, wherein the (d) graphite is from about 70 to 85 parts by weight, said titanium dioxide pigments are from about 20 to about 30 parts by weight and said in-mold coating composition is substantially free of carbon black.

10. A thermoset coating composition comprising;

(a) from about 20 to about 85 parts by weight of graphite (b) from about 15 to about 50 parts by weight of one or more white pigments (c) optionally up to 10 parts by weight carbon black so that the coating composition when cured has a Ransburg conductivity meter reading of at least 165 units on a 1.0 mil thick coating and wherein said graphite and white pigments result in a thermoset coating of uniform gray color (d) at least one polymerizable epoxy based oligomer having at least two (alkyl) acrylate groups and a weight average molecular weight of from about 500 to 1,500, said (alkyl) acrylate being acrylate, methacrylate, or ethacrylate;

(e) from about 80 to 160 parts by weight of at least one copolymerizable ethylenically unsaturated monomer;

(f) from about 10 to 120 parts by weight of at least one copolymerizable monoethylenically unsaturated compound having a —CO— group and at least one —NH$_2$, —NH—, or —OH group;

wherein said parts by weight are based upon 100 parts by weight of said epoxy based oligomer.

11. A thermoset coating composition according to claim 10, wherein the (e) monomer is from about 80 to 120 parts by weight, said (f) compound is from about 10 to 60 parts by weight, said (a) graphite is from about 40 to 85 parts by weight, and said (b) white pigments are titanium dioxide pigments.

12. A thermoset coating composition according to claim 11, wherein said (d) epoxy based oligomer is a diacrylate ester of bisphenol A epoxy resin, said (e) monomer is styrene, said (f) compound is hydroxypropyl methacrylate, and said titanium dioxide pigment is from about 15 to 30 parts by weight.

13. A thermoset coating composition according to claim 10, which includes carbon of black in an amount up to 5 parts by weight.

14. A thermoset coating composition according to claim 13, wherein said polymerizable epoxy-based oligomer of (d) is a diacrylate ester of a liquid bisphenol A epoxy resin, wherein said (e) monomer is styrene, and wherein said (f) compound is hydroxypropyl methacrylate.

15. A thermoset coating composition according to claim 11, wherein said graphite is present in amounts from about 70 to about 85 parts by weight and said coating composition is substantially free of carbon black.

16. In a process for in-mold coating a surface of molded fiber reinforced plastic parts using a thermoset (alkyl) acrylate-terminated epoxy oligomer-based coating composition cured with ethylenically unsaturated monomers, said (alkyl) acrylate being acrylate, methacrylate, or ethacrylate, the improvement wherein said coating comprises from about 20 to about 85 parts by weight of graphite forming an in-mold coating of uniform gray color having a Ransburg conductivity meter reading of at least 165 units on a 1.0 mil thick coating and including from about 15 to about 50 parts by weight of titanium dioxide pigments and wherein said parts by weight are based upon 100 parts by weight of the (alkyl)acrylate-terminated epoxy oligomer of said coating composition.

17. In a process according to claim 16, wherein said graphite is present from about 40 to 70 parts by weight per 100 parts of (alkyl) acrylate-terminated epoxy oligomer and wherein said titanium dioxide pigments are present from about 20 to 30 parts by weight per 100 parts by weight of said (alkyl) acrylate-terminated epoxy.

18. In a thermoset coating composition including an epoxy-based oligomer having at least two (alkyl) acrylate groups, at least one copolymerizable ethylenically unsaturated monomer, and at least one copolymerizable monoethylenically unsaturated compound having a —CO— group and at least one —NH$_2$, —NH—, or —OH group, said (alkyl) acrylate being acrylate, methacrylate, or ethacrylate, the improvement wherein said composition comprises from about 20 to 85 parts by weight graphite and from about 15 to 50 parts by weight of one or more white pigments resulting in a uniform gray coating wherein having a Ransburg conductivity meter reading of at least 165 units on a 1.0 mil thick coating, optionally up to 10 parts by weight of carbon black, and wherein said parts by weight are based upon 100 parts by weight of said epoxy-based oligomer.

19. In a thermoset coating composition according to claim 18, wherein the amount of said graphite is from about 70 to 85 parts by weight and said composition is substantially free of carbon black.

20. In a thermoset coating composition according to claim 18, wherein said epoxy-based oligomer is an acrylate, methacrylate, or ethacrylate terminated bisphenol A oligomer; said white pigments are titanium dioxide pigments; the amount of said graphite is from about 40 to 70 parts by weight; the white pigments are from about 20 to 30 parts by weight; and wherein said coating composition includes up to 5 parts carbon black.

\* \* \* \* \*